United States Patent [19]

Strand

[11] Patent Number: 4,793,742

[45] Date of Patent: Dec. 27, 1988

[54] TRUCK MOUNTED FERTILIZER APPLICATOR USING FLUID CONVEYING

[75] Inventor: Glen L. Strand, Murdock, Minn.

[73] Assignee: TCI, Inc., Benson, Minn.

[21] Appl. No.: 104,784

[22] Filed: Oct. 5, 1987

Related U.S. Application Data

[63] Continuation of Ser. No. 840,585, Mar. 17, 1986, abandoned.

[51] Int. Cl.$^4$ .............................................. B65G 53/48
[52] U.S. Cl. .............................. 406/79; 406/144/39; 239/655; 222/272
[58] Field of Search ............... 406/39, 70, 79, 123, 406/144, 41, 77, 122, 139, 140, 155, 181; 239/654, 655, 664, 673, 676, 682; 222/272; 414/489, 502, 528

[56] References Cited

U.S. PATENT DOCUMENTS

| 749,300 | 1/1904 | Kemp | 406/144 X |
| 2,343,163 | 2/1944 | Vose | 406/144 X |
| 2,391,048 | 12/1945 | Vose | 406/144 X |
| 3,963,138 | 6/1976 | Powler | 414/502 |
| 4,529,104 | 7/1985 | Tyler | 222/630 X |
| 4,562,968 | 1/1986 | Widmer et al. | 239/655 |
| 4,569,486 | 2/1986 | Balmer | 239/655 |

FOREIGN PATENT DOCUMENTS

| 2238329 | 2/1974 | Fed. Rep. of Germany | 239/676 |
| 200199 | 3/1983 | German Democratic Rep. | 239/676 |
| 2090216 | 7/1982 | United Kingdom | 406/79 |

OTHER PUBLICATIONS

Tyler "Fluid-Air Z150", brochure, Tyler Corp., 1/1983, pp. 1-2.
Advertisement by Air Progress, Inc. showing Valmar Airflo units, publication date unknown.

Primary Examiner—Sherman D. Basinger
Assistant Examiner—Paul E. Salmon
Attorney, Agent, or Firm—Kinney & Lange

[57] ABSTRACT

A truck mounted particulate material applicator which entrains metered amounts of the particles in a fluid for conveying the material outwardly along tubes forming boom assemblies. The metering assembly and the booms are mounted in the mid portion of the truck wheel base for minimizing bouncing, and excess shock loads on the booms during travel, and also for providing a centrally located distribution point for the metering assembly. The present device includes a unique manifold for entraining particulate materials such as inorganic fertilizer or grains in fluid flow streams within tubes in which they form the boom assemblies. Each tube carries the metered air entrained material a different distance from the center to cover a wide path. Separate tubes are directed toward the rear of the truck to spread the material in the path of the truck.

12 Claims, 4 Drawing Sheets

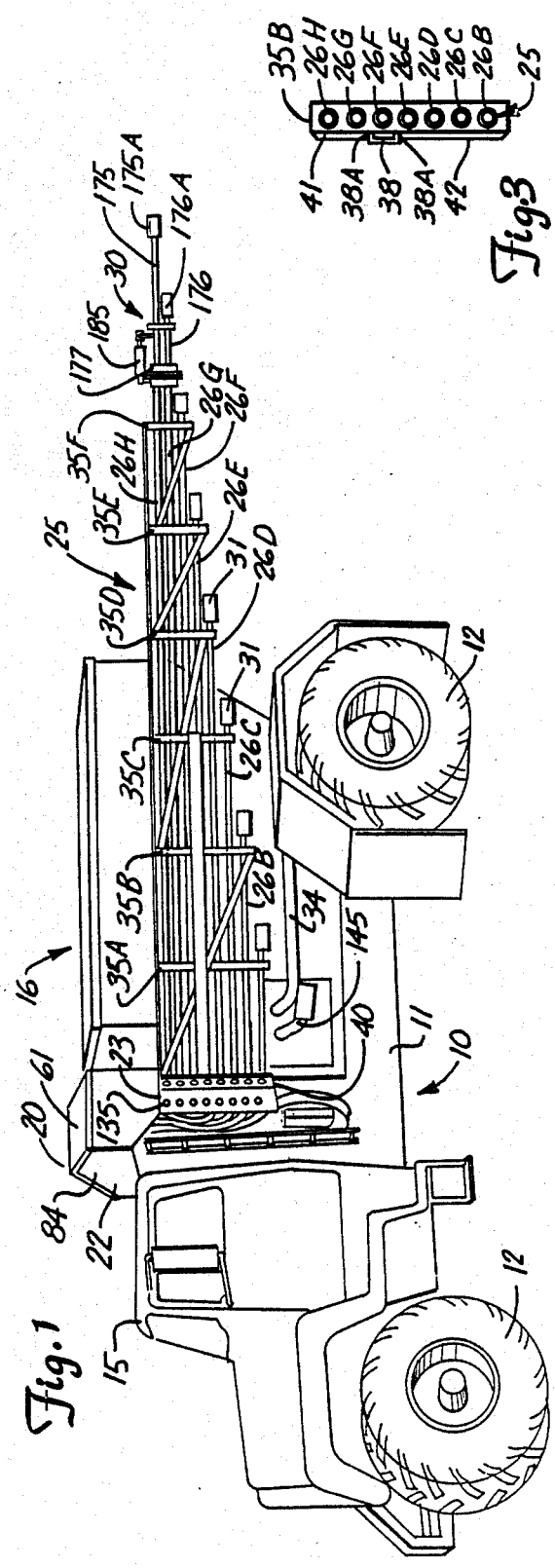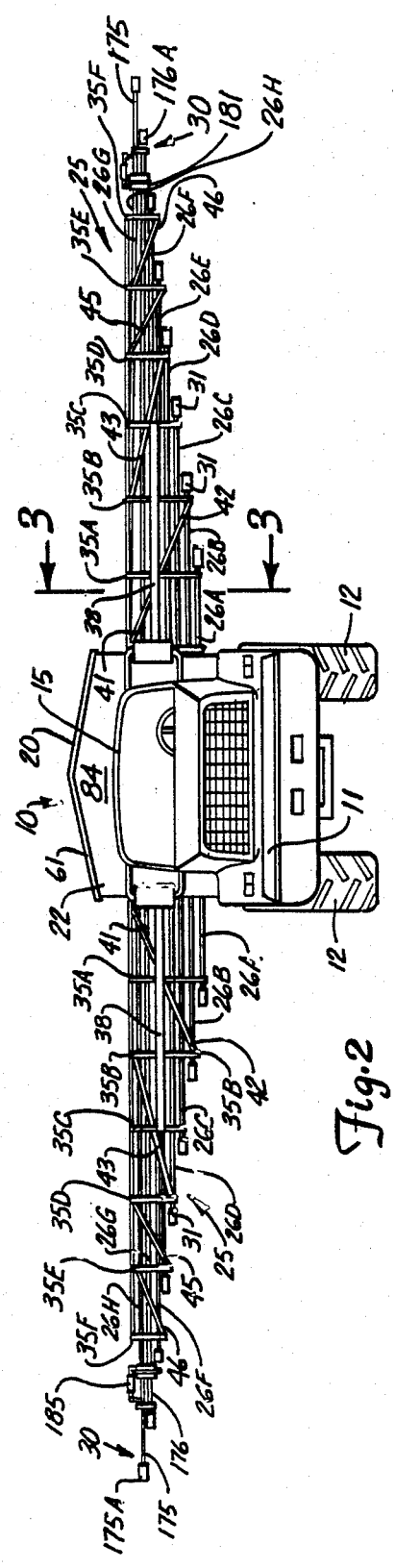

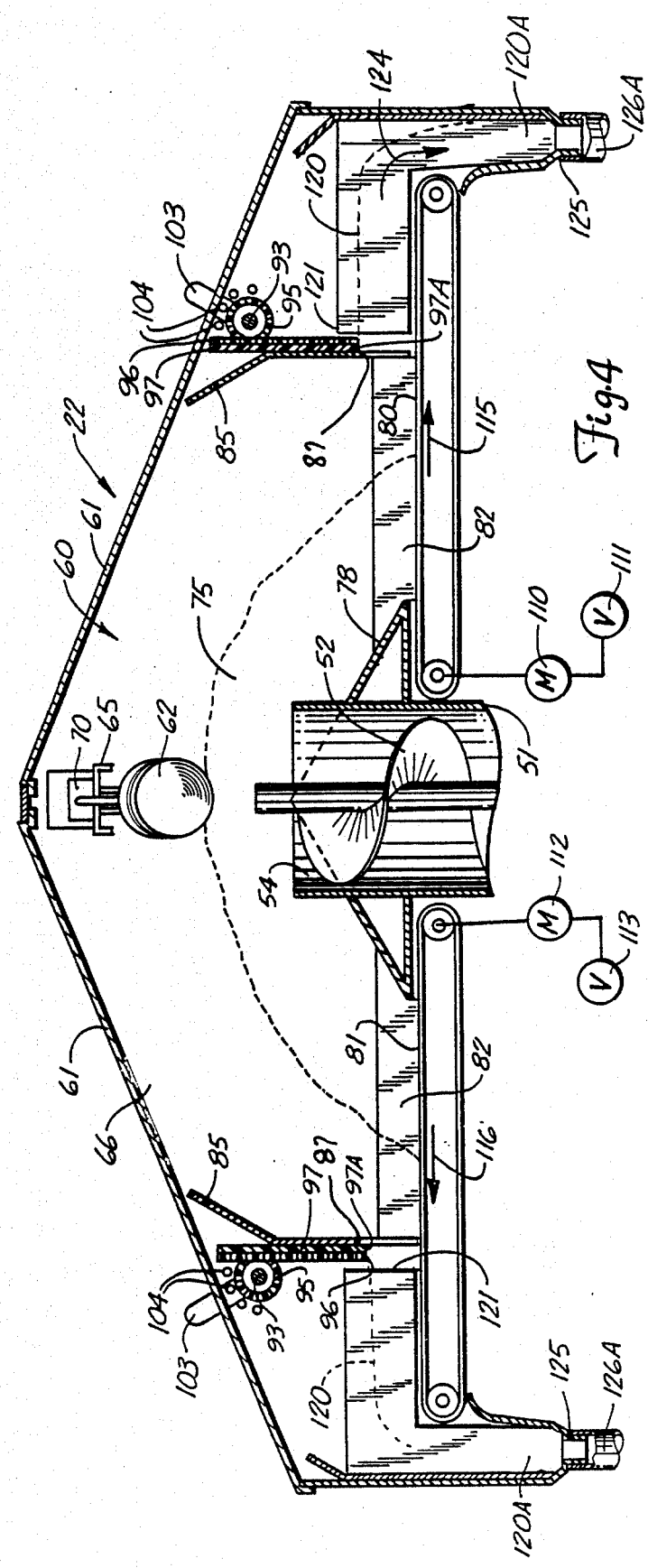
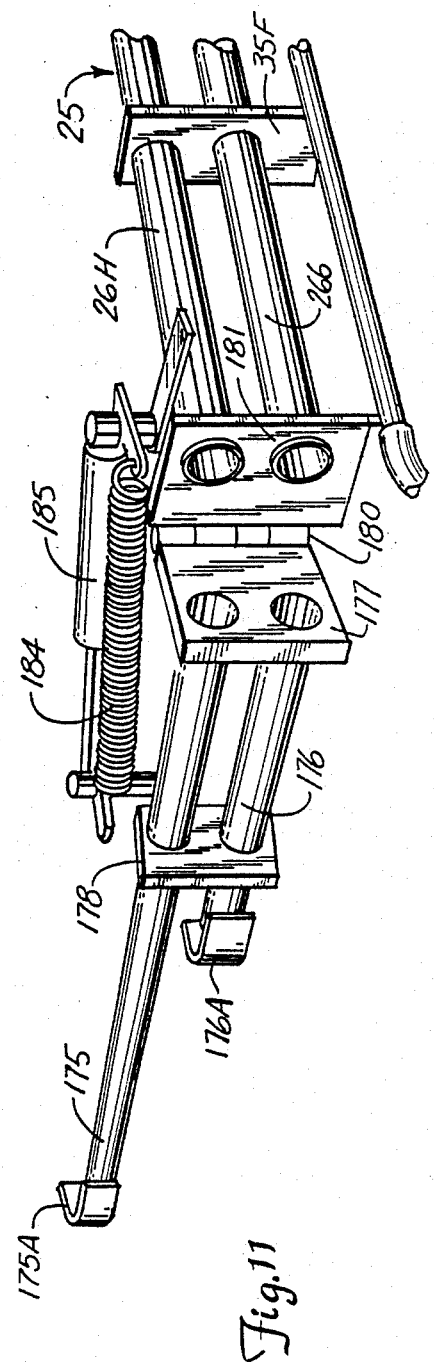

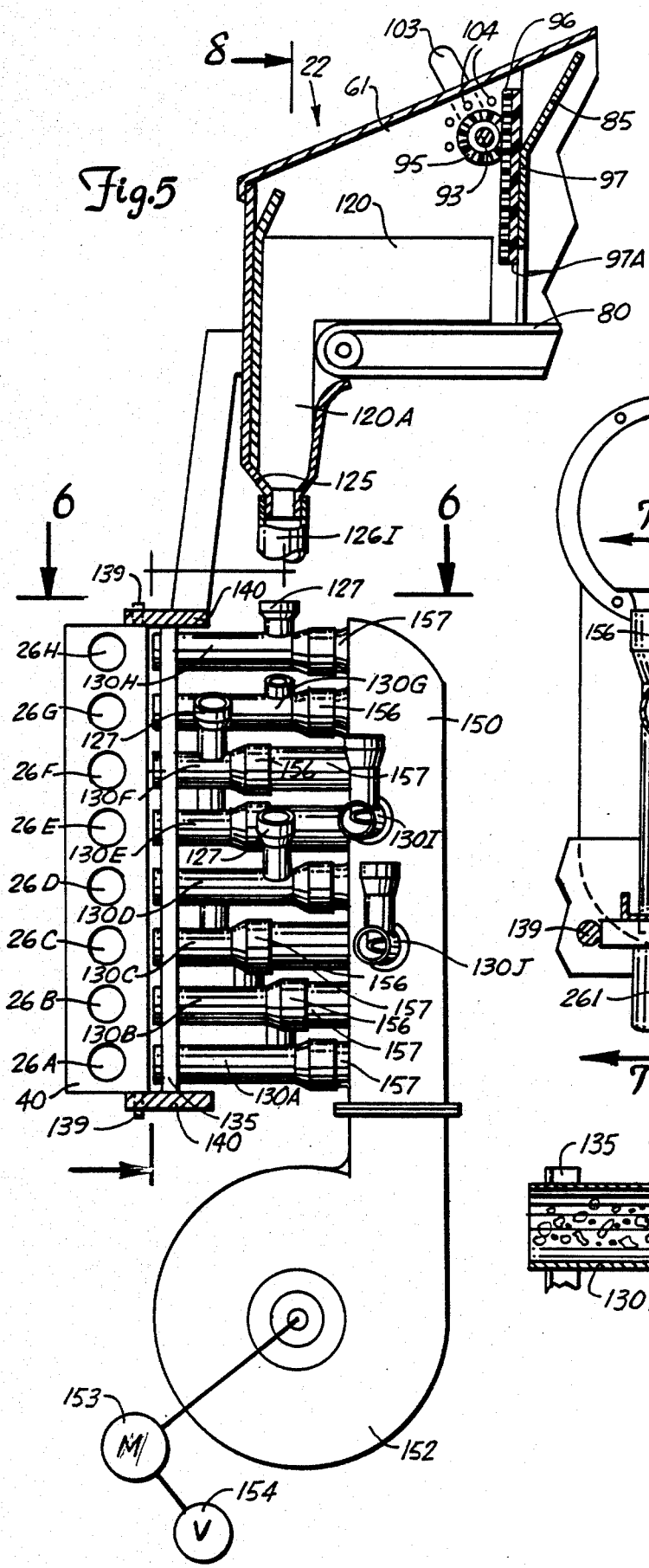
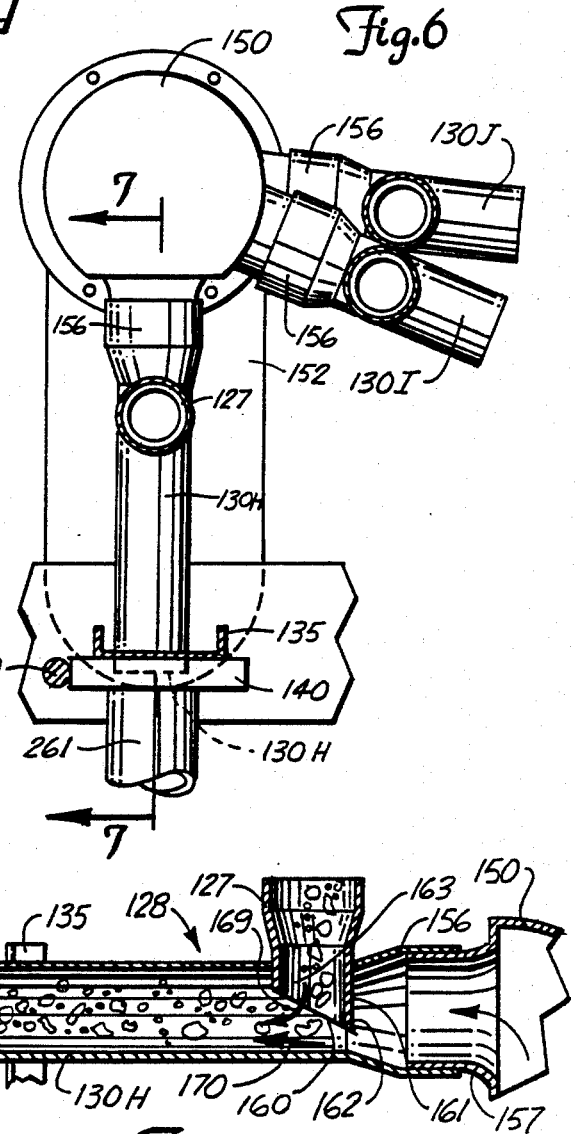
Fig.5  Fig.6  Fig.7

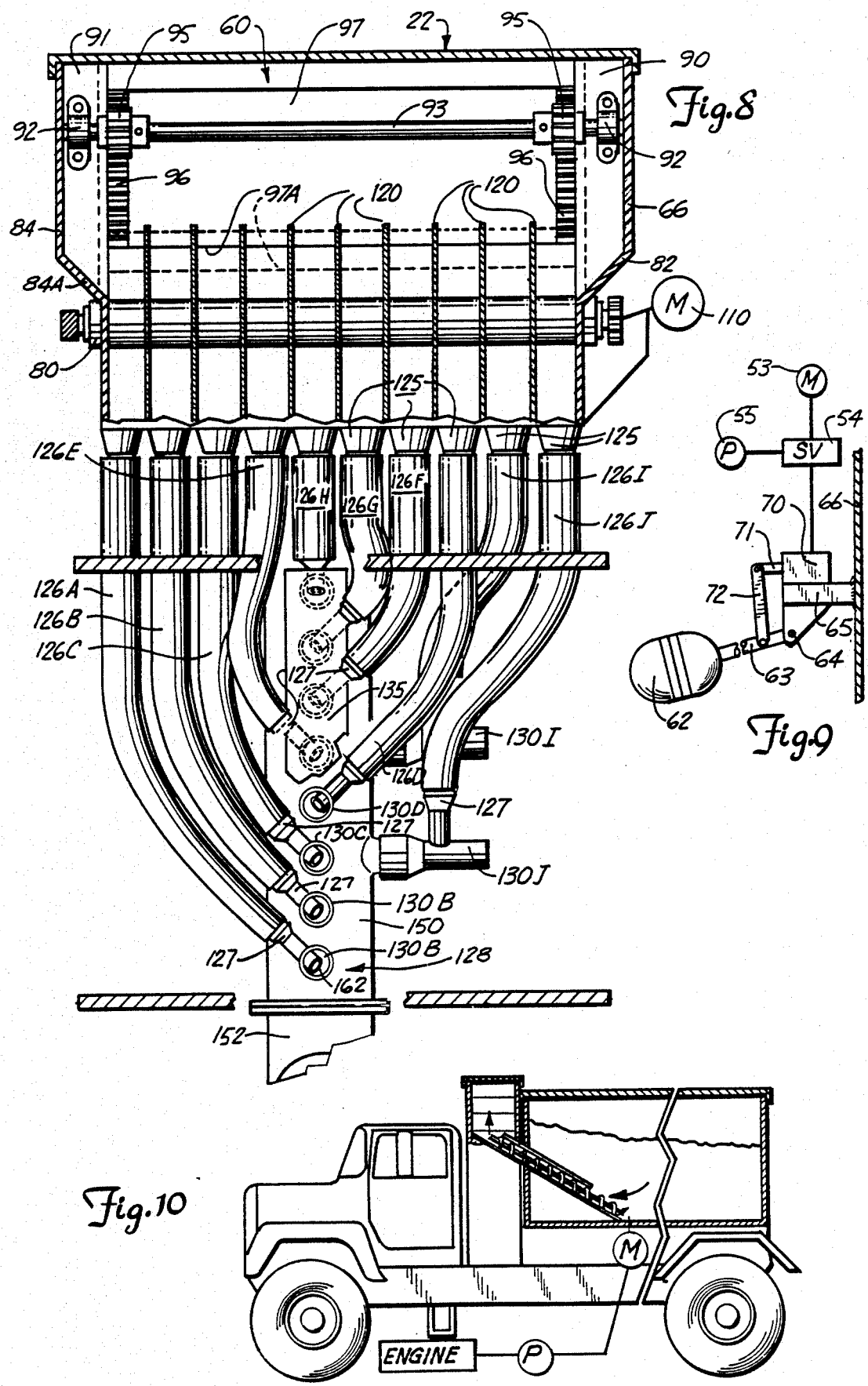

TRUCK MOUNTED FERTILIZER APPLICATOR USING FLUID CONVEYING

CROSS REFERENCE TO RELATED APPLICATION

This application is a continuation of my copending application Ser. No. 840,585, filed Mar. 17, 1986, now abandoned.

BACKGROUND OF THE INVENTION

1. Field of the Invention.

The present invention relates to a spreader for a fluid distribution system for particulate material.

2. Description of the Prior Art.

In the prior art, the distribution of inorganic fertilizers has been accomplished in many different vehicles including truck mounted spreaders that utilize air for entraining the material and distributing it through wide booms. Self-propelled units generally have long, laterally extending booms at the rear of the truck, and can use various types of air entraining manifolds for distributing the materials. The rear mounted booms are susceptible to load and bounce problems when moving over rough ground.

The "Valmar" airflow applicator is a spreader that mounts in a pickup body and entrains material in a stream of air and sends the material out through tubes that extend laterally from a pickup body. The unit is made so that when mounted in a pickup box the boom assembly is close to the cab of the pickup. The Valmar airflow device individually meters materials into a type of receptacle and then entrains the material to be sent into each of the conduits in a flow of air. The device is made by Valmar Industries in Canada.

SUMMARY OF THE INVENTION

The present invention relates to an applicator or spreader for particulate or granular materials utilizing a fluid entraining distribution system for entraining metered particulate material, such as particulate or dry fertilizer or grain, and distributing it out through a boom system onto the ground.

The unit includes a tank mounted on a prime mover, such as a truck having high floatation tires, and includes a metering hopper assembly and air manifold system mounted right behind the cab of the truck. The laterally extending booms are also mounted in this mid portion so that the effects of rough ground and "bouncing" is less pronounced than with a rear mounted and the boom is visible to an operator.

The positive metering or proportioning of the granular material occurs before it enters the air stream, and an efficient manifold and mixing chamber allows for low power requirements for causing the metered materials to be entrained in fluid and carried into individual boom tubes and then distributed out at different distances from a center line. The boom is a floating boom, and is lightweight, while having substantial strength because of a bridge type bracing construction of the boom.

The metering mechanism is separate for each boom assembly (one on each side of the truck) and comprises a belt that runs generally horizontally and forms the bottom of a metering hopper. The fertilizer or other material is deposited on the belt and then carried past a plurality of vertical, spaced plates which have sharp edges to divide the material on the belt into individual portions extending along the length of the belt. The sharpened edges of the divider plates insure that there is an adequate and quick division of the material on the belt. A metering gate is used for controlling the height of material carried on the belt before the material reaches the divider plates. The gate meters the amount of material that goes into the individual divided portions. Separate tubes collect the respective individual metered portions as the material is dropped off the belt. The separate tubes guide the material into metering chambers where air streams from the manifold are present to entrain the particles in the air streams. The region where the particles are entrained reduce in area to increase the velocity of the air around the tubes or nozzles which supply the metered material to the air streams.

The particulate material is transported from a storage tank to the hopper for the metering assembly by an auger. A float shut-off device controls the level of material in the hopper to insure that there is an adequate supply of particular material, but not an excessive supply.

The spreader is made so that material can be selectively discharged out one boom or the other, or both booms at the same time.

When mounted immediately behind the cab as done herein, the boom ends are visible to the driver, and easily seen, so that skips in the pattern or overlaps of spreading are minimized. Suitable markers can be used for making a visible mark at the ends of the booms for determining the proper position.

Further, because of the division or metering of the material in a relatively small hopper, using the conveyor belts, the material is not substantially segregated by density or weight as occurs in some applicators.

The components are driven through hydraulic motors that are operated through a known variable piston pump, which is crank shaft mounted onto the truck so that there is hydraulic power at all times for the distribution system.

The spreader can be used for grain, grain and fertilizer combined, granular herbicide, fertilizer, or granular fertilizer impregnated with liquid herbicides.

BRIEF DESCRIPTION OF THE DRAWINGS

FIG. 1 is a part perspective side view of a spreader having a fluid based distribution system made according to the present invention;

FIG. 2 is a front elevational view of the device in FIG. 1 showing the booms in a working position;

FIG. 3 is a sectional view taken on line 3—3 in FIG. 2;

FIG. 4 is a fragmentary vertical sectional view of a metering hopper and metering distribution assembly made according to the present invention;

FIG. 5 is a sectional view of one side of the device shown in FIG. 4, and showing the air distribution manifold used with the present invention;

FIG. 6 is a sectional view taken as on line 6—6 in FIG. 5;

FIG. 7 is a sectional view taken as on line 7—7 in FIG. 6;

FIG. 8 is a view taken as on line 8—8 in FIG. 5;

FIG. 9 is an enlarged, fragmentary, part schematic representation of a shut-off float and valve assembly used with the device of the present invention;

FIG. 10 is a schematic side view of a typical tank illustrating the conveying of particulate material into the metering hopper of the present invention; and FIG. 11 is a fragmentary perspective view of a break away portion of the boom assembly of the present invention.

DETAILED DESCRIPTION OF THE PREFERRED EMBODIMENTS

A truck indicated generally at 10 is of the type having a frame 11, and large floatation type wheels and tires 12 that are mounted on the front and rear axles. The truck can be rearwheel drive or fourwheel drive if desired, and includes an operator cab 15, and a particulate material distribution system indicated generally at 16. The distribution system includes a storage tank 17 that mounts onto the frame 11 of the truck, overlying the rear wheels, and this storage tank can have covers 18 provided in the normal manner.

A metering and air distribution system indicated generally at 20 is positioned ahead of the storage container 17, immediately to the rear of the cab 15 and thus is approximately mid-ship or in the range of halfway between the front and rear wheels 12.

The air distribution system includes a material metering hopper 22, and boom support frame assemblies indicated generally at 23 are mounted on opposite sides of the metering hopper and adequately braced back to the structural components of the distribution system 16. The boom support frames each mount hinged boom assemblies 25, that are pivoted about upright axes and are foldable from a position shown in FIG. 1 where the booms extend rearwardly back along the sides of the truck and container 17, to position where the boom assemblies 25 extend laterally out from the truck 10 to cover a substantial width for travel down the field.

The boom assemblies 25 are unique integrated structures that comprise a plurality of individual laterally extending tubes (or conduits) 26 that are vertically spaced and of different lengths horizontally.

As shown in FIGS. 1 and 2, the lower most tube shown at 26A is substantially shorter than the upper tube 26H. The intermediate tubes are of graduated length. The upper most pair of tubes 26H and 26G have outer sections forming a pivoting assembly 30 that will fold forwardly along the main portion of boom assemblies 25 when the boom assemblies are folded. The folding action of portion 30 is shown in FIG. 11, and not in FIGS. 1 and 2.

The outer end of each of the tubes 26 has a deflector shown generally at 31 thereon which is used for directing material in a desired manner. The deflectors are spaced approximately 36 inches apart horizontally.

The boom arrangement and deflectors give a substantially uniform distribution of granular material across the ground over which the truck 10 is traveling, and as shown in FIG. 1 only schematically, separate distribution tubes 34 are provided from the air distribution manifold, which will be described, along each side of the truck. These tubes 34 extend rearwardly to cover the area of the ground behind the truck after the truck has passed over the area.

The boom assemblies 25 on each side of the truck are provided with a plurality of upright support webs 35A, 35B, 35C, 35D, 35E, and 35F. The webs 35A–35F are plates or channels which have openings through which the individual tubes 26 pass, and the tubes are tack welded into the vertical webs 35A–35F where they pass through the webs.

A horizontal brace channel member 38 has legs 38A (see FIG. 3) that are welded to the webs 35A, 35B and 35Cc as well as to a base vertical member 40, which is hinged in place as will be explained. The channel 38 provides a reinforcing member on each of the boom assemblies 25. Additionally, diagonal braces are structurally attached to permit the boom assembly to flex but yet give great vertical strength and stability. Diagonal members 41 on each of the boom assemblies are welded to the base vertical member 40, and also the opposite ends of the members 40 are welded to one of the legs 38A of channel 38, as shown in both FIGS. 2 and 3. A lower diagonal member 42 is welded at a first end to the lower leg 38A of the channel 38 and its opposite end to the lower end of the vertical web member 35B. Note that at the end of brace 42 that is adjacent to the channel 38, the brace 42 can also be welded to the vertical web member 35A. A diagonal brace 43 is welded to the upper end of vertical web member 35B, and to the web member 35C in the center portions and then the lower end of brace 43 is welded to the lower end of vertical web member 35D. Additional diagonal braces indicated at 44 and 45 are welded at their opposite ends to the respective vertical web members 35D and 35E for brace 45, and to the upper end of vertical web member 35E and to the lower end of vertical web member 35F insofar as the brace member 46 is concerned.

The outer end folding section 30 is supported onto the main portion of each boom assembly 25 and does not have any diagonal braces. The diagonal braces are long enough to span a plurality of tubes 26, but they are welded only at spaced ends and not to all of the tubes 26 which they span.

Referring briefly to FIG. 10, the material container or compartment 17 is shown in cross section, and has an interior storage chamber 48, and as can be seen schematically, an auger assembly 50 is mounted in the chamber 48, in a convenient location. An auger tube 51 extends from the bottom of container 48 upwardly to the interior of metering hopper 22. An interior helical auger 52 is mounted in tube 51, the auger is driven with a suitable hydraulic motor 53 through a valve 54 from a pump 55. The pump 55 is driven from an engine 56 of the truck which is shown schematically. The pump is driven from a live power source such as the crank shaft of the engine 56 so that there is hydraulic pressure available whenever the engine of the truck is running. Of course, a suitable hydraulic reservoir would be provided but is not included in this schematic representation in FIG. 10. Upon rotation of the auger 52, granular or particulate material indicated at 55A inside the container 48 will be conveyed upwardly and forwardly, into the metering hopper 22, which as shown has an interior storage compartment 60.

The motor 53 is controlled in turn by a level detector on the interior of the hopper compartment 60. Reference is made to FIG. 4 where the interior compartment 60 is shown enclosed with a suitable cover 61 on each side of the hopper, and as shown the covers slope from the center outwardly toward the outer ends. The level of the material inside the hopper compartment 60 is determined by a float or light ball member 62 which is shown in FIGS. 4 and 9. FIG. 9 schematically shows the arrangement with a light ball (such as a toilet tank float) mounted onto a pivoting arm 63, that is pivotally mounted as at 64 to a bracket assembly 65 that is fixed to a rear wall 66 of the hopper.

The bracket 65 also mounts, on its upper side, a suitable switch 70 that has an outwardly extending arm 71. The arm 71 operates the switch 70 to turn it on and off upon vertical movement of the float ball as shown in FIG. 9. The arm 71 is connected to arm 63 with an adjustable length link 72. The float 62 will move up as material piles up from the end of the auger tube 51 as shown in FIG. 4. This will cause movement of the arm 71 for the switch 70, and when the float 62 moves a sufficient distance, the switch 70 will be operated to control solenoid valve 54 to turn off motor 53.

When the power is turned on, for example when the key to the truck is turned on, and hydraulic power is available and the float 62 drops under gravity as material in chamber 60 reduces in level, the arm 71 will move downwardly again turning on the solenoid valve 54 through the action of switch 70. This will then maintain a pile of material near the center portions of the hopper compartment generally as shown at 75 in FIG. 4.

Tapered guide walls 78 are formed around the auger tube in the center of the compartment 60, and the walls 78 taper outwardly toward the lateral sides of the hopper 22.

The bottom of the hopper 22 is formed in part by live conveyor belt assemblies indicated generally at 80 and 81, respectively, the inner ends of which fit under the walls 78 near the center of the hopper compartment. The tapered walls 78 extend fore and aft between the front wall 84 and rear wall 66 of the hopper 22. The edges of the conveyor belts 80 fit closely to the front and rear walls of the hopper 22 as well and guides can be provided to overlap the edges of the belts to prevent materials from dropping past the belt edges. As can be seen in FIG. 8, the rear wall 66 of the hopper has a lowered tapered end 82 that extends over the edge of the belts 80 and 81, respectively, and the front wall 84 of the hopper 22 has a tapered section 84A which again overlaps over the edge of the conveyor belts 80 and 81, respectively. The left and right hand sides of the hopper as shown in FIG. 4 are identically constructed, so only one is shown herein. The conveyor belts 80 and 81 form feed devices for feeding materials such as grain or fertilizer into dividers and through a metering gate and ultimately into the distribution tubes 26 forming part of the boom assemblies 25.

Because the parts on the right and left sides of the hopper are mirror images, the same numbers will be used, except for the conveyor belts and drives because they can be individually operated.

The hopper has cross walls 85 spaced from the center of the hopper, and also spaced from the ends of the hopper, that extend between the front and rear walls 84 and 66, respectively, and which fit above the tapered wall edge portions 82 and 84A. The cross walls 85 have lower edges shown at 87 in FIG. 4, spaced above the conveyor belts 80 and 81. The walls 85 extend completely across the hopper and are attached to the walls 66 and 84.

Additionally, metering gates support guides 90 and 91, respectively (see FIG. 8), are mounted onto the front and rear walls 66 and 84 at each end of the hopper, respectively. The support guides 90 and 91 at each end of the metering hopper mount bearings 92 in which a cross shaft 93 is rotatably mounted. Each cross shaft 93 in turn has a pair of pinion gears 95,95 thereon which are on opposite sides of the hopper, on each end, and these pinion gears 95 mate with rack gears 96 that are attached to a respective metering gate 97 on each end of the hopper. The metering gates 97 are positioned above conveyor belts 80 and 81, respectively. Each metering gate 97 is guided suitably on the support guides 90 and 91, through the use of conventional tracks or guide slots as shown in dotted lines, and also each metering gate 97 is held adjacent the vertical portions of the respective wall 85 as shown in FIG. 4, so that the gates 97 can be raised and lowered to control the size (vertical height) of the opening above the belts that extend from the front to the rear of the hopper. The height of the lower edges 97A of the metering gates thus controls the amount of material that is carried on the upper lengths of the conveyor belts 80 and 81 when the belts are powered and moving toward the respective ends of the hopper.

The height of each of the gates 97 is controlled by a manually operated handle 103 drivably mounted on each shaft 93 at one end of the respective shaft. The handles 103 are each retained in a desired angular position by using a spring pin carried on the handle that will fit into one of a plurality of openings 104 in the adjacent wall of the hopper or in a separate adjustment plate fixed to the hopper wall. When the handle retainer pin is released (pulled from its latch hole) the handle 103 is moved to rotate shaft 93 and thus the pair of gears 95 on the shaft will drive the racks 96 and metering gates 97 either up or down, as desired.

As can be seen in FIG. 4 schematically, the belt 81 is powered with a motor 110, that is operated through a separate valve 111. The belt 81 is driven with a separate motor 112 that is operated with a valve 113. The valves 111 and 113 can be manually operated, or can be solenoid valves if desired. The valves 111 and 113 can be individually controlled or if desired can be latched together so that they will be operated simultaneously. The motors 110 and 112 regulate the rate of feed of material that passes under the gates. By individually operating the motors 110 and 112, the boom assemblies can be individually used when desired. The motors 110 and 112 may be operated at a variable speed by controlling the valve, or by having separate variable speed valves.

When the belts 80 and 81 are individually powered, the upper lengths of the belts will move in the directions as indicated by the arrows 115 and 116, respectively, and thus will move the granular material, such as fertilizer or grain, from the pile shown at 75 laterally outwardly to the opposite ends of the metering hopper 22. After passing under the metering gate assemblies, which trim off the top of the material to a uniform (metered) level, the belts run underneath a plurality of inverted L-shaped plate dividers shown at 120. As also shown in FIG. 4 these dividers 120 are planar type walls that have sharpened leading edges 121. These end edges are sharpened to knife points as indicated, to aid in separating the material carried by the respective belts 80 and 81 into the desired number of individual portions. The width between the plates 120 is fixed, so the variations of the quantity on the belt is the height of the material on the belt. As shown in FIG. 8 when the gates 97 are raised this can be a substantial depth of material that will pass below the lower edge 97A. The metering gates 97 can be lowered to a dotted line indication for the lower edge 97A as indicated in FIG. 8, so that the material in each of the individual metered portions will be reduced for a lower rate of feed, for the same speed of the conveyor belts 80 and 81. The feed rate in relation to forward travel of the spreader can be changed by regulating either gate height or motor speed, or both.

There is a horizontal space between the gates 97 and the edges 121 of the divider walls that is approximately equal to the width between the divider walls. This space provides an area for the particles to shift and move slightly and aids the separation by the divider walls 120 as opposed to having the edges 121 very close to the gates.

The metered particulate material then falls off the ends of the respective belts 80 and 81 as indicated by the arrow 124 in FIG. 4, and the lower divider legs 120A of the divider plate 120 extend into cups at the lower ends of the plates between granular feeding funnels shown in FIG. 8 at 125. Each of the funnels 125 leads to a separate flexible tube 126A-126H that is connected in a suitable manner to the respective funnel 125. The flexible tubes 126A-126H are connected to corresponding air-material mixing housings or chambers 128 at their lower ends. Each of the mixing housings 128 has a nozzle 127. All nozzles 127 are identical, but each mixing housing has a different length horizontal tube forming a particle entraining chamber. The horizontal mixing tubes are shown as 130A-130H and correspond in location to the tubes 26A-26H of the boom assemblies. As shown these horizontal tubes 130A-130H have outer ends that are mounted into vertical webs or plates 135, that are adjacent the end vertical member 40 for each of the boom assemblies, on opposite sides of the machine, respectively. As shown in FIG. 5, the outer end portions of the respective tubes 130A-130H are tapered (necked down in diameter) so that when the boom assemblies are moved to their working position extending laterally outwardly, the outer ends of the tubes 130A-130H fit inside of the respective tubes 26A-26H at the vertical web or plate member 40, as shown in FIG. 6.

The web members 40 have pivot pins 139 at the top and bottom thereof which are pivotally mounted in suitable frame support member 140,140 at the top and bottom so that the boom assembly can be pivoted to position as shown in FIG. 2 and then the vertical members are as shown in FIG. 6 with the web 40 tight against the vertical web 135, and with the tapered outer end portions of the mixing tubes 130A-130H fitting inside the innermost ends of the boom tubes 26A-26H.

Additionally, two horizontal mixing tubes 130I and 130J are provided for connection to rearwardly extending distribution tube 34 and to a shorter distribution tube 145 shown in FIG. 1, respectively. The tube 34 distributes granular material to the rear of the truck and the shorter tube 145 distributes granular material immediately ahead of the rear wheels of the truck. The horizontal tubes 130A-130J each coupled directly to a plenum chamber or manifold 150A through a tapered venturi section 156. The plenum or manifold 150 is a tubular member as seen in FIG. 6, generally circular in cross section, and has large diameter connector nipples 157 that couple to the venturi sections 156 of the horizontal tubes 130A-130J, respectively.

Each plenum chamber or manifold is provided with fluid under pressure from a suitable blower 152, that is driven with a hydraulic motor 153 controlled by a valve 154 and powered from the hydraulic pump. The blowers or frames 152 on opposite sides can be individually or simultaneously controlled, just as the motors for belts 80 and 81.

FIG. 7 illustrates a typical air-particulate material mixing chamber 128. The mixing chamber shown includes horizontal tube 130H. The horizontal tube 130H, as can be seen, has the venturi section 156, that fits into a nipple outlet 157 opening from the plenum chamber or manifold 150. Each of the nozzles 127 extends into the respective corresponding horizontal tube 130A-130H, and each nozzle 127 has a tapered cut shown at 160 forming a nozzle opening which faces away from the plenum chamber. The lower wall portions 161 adjacent the manifold 150 have lower ends indicated at 162, which are below the edge of the nozzle 127 that is downstream from the manifold. The opening 164 partially faces downward and partially faces toward the outlet of the respective horizontal tube. The openings for the nozzles 127 in tubes 130 are sealed around the nozzles 127 at the junction between the nozzles 127 and tubes 130.

Thus, particulate material dropping through these nozzles 127 will move as shown by arrow 169 and be subjected to a flow of air as shown by the arrow 170 in FIG. 7, and thus flow will entrain the particulate material and cause it to move outwardly from the horizontal tubes into the respective boom tubes to be carried out to the outer ends of the boom tubes where the deflectors will direct the material in a desired manner to spread it across the ground.

The venturi section 156 causes an increase in velocity of the air, an this aids in entraining the particles adequately. Also the venturi section 156 helps to keep the required power for air flow generation low. The nipples 157 are large diameter outlets which keep the required pressure head low. The reducing sections 156 of the tubes 130 cause an increase in air velocity to raise the particle carrying capabilities of the air. The lower ends of the nozzles 127 extending into the tubes 130A–130H also cause a venturi effect. The air flowing from nipples 157 flows around the part cylindrical surface of wall portion 161 of each nozzle. The air pressure is reduced at the openings 163 so particles tend to be urged in the flowing air stream to aid in feeding.

The metering assembly operates efficiently, and by regulating the metering gates the amount of material carried by each of the boom tubes will be varied. The metering is carried out from a very small hopper section in relation to the large storage compartment, so there is less likelihood of having unwanted segregation of the material, and there is positive proportioning of the granular material such as fertilizer before it enters the air streams. The manifold is very efficient, having only the mixing tubes extending outwardly to the individual boom tubes. The manifold arrangement requires relatively low power and permits the delivery of relatively high rates of material which means the forward speed of the truck can be kept high as well. The vertical orientation of the plenum chamber provides efficient positioning of the mixing chamber (saving space) and reduces the length of connection of the boom tubes.

The boom assembly structure, including the diagonal bracing, provides for a very strong, light-weight boom.

In FIG. 11, an end section 30 of the booms 25, and its mounting to the main portion of the boom is shown. Each end section 30 comprises two short tube sections 175 and 176, which are aligned with the tubes 26H and 26G, respectively. The tubes 175 and 176 are mounted in an assembly of a first vertical base member 177, and an intermediate vertical support 178. The base member 177 mounts on a suitable hinge assembly 180 to a vertical frame portion 181 that is connected to tubes 26H and 26G as shown in FIG. 11.

The spring 184, and a suitable shock absorber 185 can be used for resisting pivoting of the outer section 30 rearwardly, but the end portion 30 can be manually moved rearwardly and locked back against the main portion of the associated boom as desired.

FIG. 11 shows typical deflectors that are used at the ends of the respective boom tubes, and these deflectors are shown at 175A and 176A, respectively. The deflectors are curved walls formed and oriented to deflect the material rearwardly as the material is discharged out the open end of the respective tubes.

The boom assemblies 25 can be latched in place when folded rearwardly from transport and also the outer ends can be supported or rested on a fixed support, to prevent loads on the hinge assembly and support 140 when the truck is moving over the road.

What is claimed is:

1. An air distribution apparatus for particulate materials discharged from a mobile boom assembly comprising a plurality of boom tubes vertically spaced apart and having axes defining a substantially common vertical plane and the boom tubes receiving particulate material from an air distribution apparatus adapted to minimize space occupied in horizontal direction, comprising:
    a frame for supporting the boom assembly and the air distribution apparatus;
    metering means for separating the particulate material into individual metered portions;
    a plenum chamber mounted on said frame and having a longitudinal axis elongated in substantially vertical direction and being below the metering means;
    a source of fluid under pressure to supply fluid to the plenum chamber;
    a plurality of outlet openings from said plenum chamber, the outlet openings being spaced in vertical direction along the longitudinal axis to form vertically spaced outlet openings, and the outlet openings being of a first diameter;
    a separate mixing chamber tube connected to each outlet opening, the mixing chamber tubes each having a transition section open to the respective outlet opening and tapering to a small diameter in direction away from the outlet opening;
    a separate nozzle positioned to open to each mixing chamber tube and adapted to carry particulate material under gravity into the mixing chamber tube, the nozzle being substantially at right angles to the respective mixing chamber tube and having a wall portion, positioned in the mixing chamber tube to form a reduced pressure at an outlet of the nozzle as fluid flows through the mixing chamber tube;
    means to mount the metering means vertically above the plenum chamber and the mixing chamber tubes;
    separate conduit means for receiving each of the metered portions connected to each of the nozzles respectively, the conduit means carrying the metered portions under gravity to the respective nozzle; and
    means to couple the mixing chamber tubes to corresponding ones of the vertically spaced tubes of the boom assembly.

2. The apparatus of claim 1 and means to support the boom tubes in position wherein the mixing chamber tubes have outer ends which telescopically fit within ends of the boom tubes with the boom assembly in a first position.

3. The apparatus of claim 2 and means to pivotally mount the boom assembly relative to the plenum chamber for movement from the first position to a second position substantially 90° from the first position.

4. The apparatus of claim 1 wherein the metering means comprises a hopper, a conveyor belt forming the bottom of the hopper, a plurality of dividers to divide material on the belt into individual sections extending in direction of belt movement, and means to control the height of material on the belt to a metered height.

5. The apparatus of claim 1 wherein the source of fluid under pressure comprises a blower providing a flow of air into the plenum chamber at the bottom thereof.

6. The air distribution apparatus of claim 1, wherein the separate nozzles each comprise a tube passing through a wall of the respective mixing chamber tube, the nozzle tubes having generally circular cross sections, and having axes for the nozzle tubes that extend generally uprightly, said nozzle tubes having ends that are trimmed along planes that are oriented at an angle with respect to the nozzle axis, the wall portion of the nozzle tubes having a first side part positioned adjacent the inlet end of the mixing tubes and extending farther into the mixing tube than other parts of the wall portion of such nozzle tube farther from the inlet of the mixing tube.

7. The air distribution apparatus for particulate materials as specified in claim 1 wherein said metering means comprises a conveyor belt having a generally horizontal plane, said conveyor belt having a discharge end positioned above the plenum chamber, whereby the metered particulate materials fall freely through said tube means from the end of the metering conveyor.

8. The apparatus as specified in claim 7 wherein the plenum chamber forms a housing that extends uprightly, and the source of fluid under pressure comprises a blower connected to the lower end of said housing, said mixing tubes being positioned vertically above said blower.

9. The apparatus of claim 1 and means to support the boom tubes in position wherein the mixing chamber tubes have outer ends which telescopically fit within ends of the boom tubes with the boom assembly in a first position.

10. An air distribution apparatus for particulate materials comprising:
    a frame;
    metering means for separating the particulate materials into individual metered portions, said metering means comprising conveyor belt means for receiving unmetered material and having discharge ends in alignment with each other but on opposite sides of the frame, said metering means dividing the material coming off each of the ends of the conveyor belt means into individual metered portions;
    a pair of plenum chambers mounted on opposite sides of the frame and comprising tubular housings that are elongated in upright direction and the upper ends of said plenum chambers being positioned below the respective ends of the conveyor belt means;
    a plurality of separate mixing tubes mounted directly onto said plenum chambers, respectively, and positioned in vertically spaced direction on the plenum chambers, said mixing tubes having axes extending generally laterally from the plenum chambers;
    means to provide fluid under pressure to each of the plenums to thereby provide a flow through the mixing tubes; and
    a plurality of conduits, said metering means including means for coupling each of the individual metered portions into one conduit, each of said conduits being connected to a separate one of said mixing tubes, respectively, whereby the material being metered falls under gravity from the ends of the conveyor belt to the respective separate mixing tube.

11. The air distribution apparatus of claim 10 and a storage container mounted relative to said conveyor belt means, auger means for conveying said material from said storage conveyor to said metering means, and for depositing material on the conveyor belt means for conveying to the portions of the metering means for dividing the material into individual portions.

12. The apparatus as specified in claim 11 and a boom assembly having a plurality of boom tubes corresponding in positioning to the plurality of mixing tubes, and means to support the boom tubes on opposite sides of the frame in positions so that the boom tubes form a continuation of the mixing tubes for distribution of the particulate material.

* * * * *